United States Patent [19]

Collier et al.

[11] 4,274,877
[45] Jun. 23, 1981

[54] METAL POWDERS

[75] Inventors: Owen N. Collier; Stephen J. Hackett, both of Reading, England

[73] Assignee: Johnson, Matthey & Co., Limited, London, England

[21] Appl. No.: 962,790

[22] Filed: Nov. 20, 1978

Related U.S. Application Data

[63] Continuation-in-part of Ser. No. 702,727, Jul. 6, 1976, Pat. No. 4,130,506.

[30] Foreign Application Priority Data

Jul. 4, 1975 [GB] United Kingdom ............... 28264/75

[51] Int. Cl.³ ................................................ B22F 1/02
[52] U.S. Cl. .................................... 75/252; 75/0.5 AC
[58] Field of Search ................... 75/0.5 AC, 251, 252

[56] References Cited

U.S. PATENT DOCUMENTS

| | | | |
|---|---|---|---|
| 3,732,091 | 5/1973 | Paris et al. | 75/0.5 AC |
| 3,966,463 | 6/1976 | Fraioli et al. | 75/0.5 AC |
| 4,023,961 | 5/1977 | Douglas et al. | 75/0.5 AC |
| 4,130,506 | 12/1978 | Collier | 75/0.5 A |

FOREIGN PATENT DOCUMENTS

| | | | |
|---|---|---|---|
| 736572 | 9/1955 | United Kingdom | 75/0.5 R |
| 824092 | 11/1959 | United Kingdom | 75/0.5 R |
| 827016 | 1/1960 | United Kingdom | |
| 854122 | 11/1960 | United Kingdom | 75/0.5 R |
| 1000353 | 8/1965 | United Kingdom | 75/0.5 R |
| 1257995 | 12/1971 | United Kingdom | 75/0.5 R |
| 1308604 | 2/1973 | United Kingdom | 75/0.5 R |
| 1403198 | 8/1975 | United Kingdom | 75/0.5 R |
| 1411500 | 10/1975 | United Kingdom | 75/0.5 R |

*Primary Examiner*—M. J. Andrews
*Attorney, Agent, or Firm*—Cushman, Darby & Cushman

[57] ABSTRACT

This invention relates to metal powders. In particular, the invention provides a novel metal-refractory composite powder which will withstand high temperatures, and means for its production. The metals for which the invention will have special application are platinum, palladium, rhodium, ruthenium, iridium, osmium and gold and silver.

According to the invention, a metal powder suitable for use at high temperatures comprises an intimate mixture, other than a mere physical admixture, of particles of platinum, palladium, rhodium, ruthenium, iridium, osmium, gold or silver, or an alloy containing one or more of said metals, and particles of a refractory material.

5 Claims, 2 Drawing Figures

METAL POWDERS

This application is a continuation-in-part application of application Ser. No. 702,727 filed July 6, 1976, now U.S. Pat. No. 4,130,506.

This invention relates to metal powders. In particular, the invention provides a novel metal-refractory composite powder which will withstand high temperatures, and means for its production. The metals for which the invention will have special application are platinum, palladium, rhodium, ruthenium, iridium, osmium and gold and silver.

A disadvantage of using prior art metal powders at high temperatures, particularly temperatures approaching or exceeding the melting point of the metal, is that the metal, even if it does not actually melt, tends to sinter. Thus, the individual metal powder particles tend to fuse together and form agglomerates or aggregates with the result that the physical properties associated with the metal in powder form are destroyed.

In the case of a metallic gold powder which is frequently incorporated in decorative compositions applied to, for example, ceramic ware, the decorated ware is fired at temperatures in the region of 860° C. However, if firing of the decorated ware is carried out at higher temperatures such as those up to and exceeding the melting point of gold, the resultant gold decoration (usually in the form of a film) shows improved chemical and mechanical durability. Further for some time there has been a need for gold decorations which may be fired at temperatures equal to those used for fire resistant decorations, that is at temperatures at which the glaze composition is soft. Such temperatures generally lie between 1200° C. and 1400° C.

In this specification, reference to high or higher temperatures refers to temperatures up to and exceeding by, for example 100° C. to 150° C., the melting point of the metal concerned. In the case of gold, the said high temperature would be in the region of 1400° C.

It is an object of the present invention to provide a metal powder which, at temperatures approaching, equal to or exceeding the melting point of the metal, does not suffer from the foregoing disadvantage.

According to one aspect of the invention, a metal powder suitable for use at high temperatures comprises an intimate mixture, other than a mere physical admixture, of particles of platinum, palladium, rhodium, ruthenium, iridium, osmium, gold or silver, or an alloy containing one or more of said metals, and particles of a refractory material. Such powders will hereinafter be referred to as "metal-refractory composite powders" or merely as "composite powders".

The refractory material may be any material from the range of naturally-occurring and synthetic refractories. Examples of naturally-occurring refractories are clays, silica, alumina, titania, zirconia, bentonite, boehmite and/or mixtures of these and examples of synthetic refractories are silicon nitride, silicon carbide and/or mixtures of these. In addition, re-processed naturally occurring refractories may be used such as sol-gel alumina.

The refractory materials which we prefer to use are those the particles of which, under the pH conditions obtaining during the preparation of the metal-refractory composite powders, are positively charged over at least part of their surface area. Of these, we particularly prefer to use sol-gel alumina, which has an overall positive surface charge, and china clay, the particles of which present a positive charge along their edges but not on their faces. We believe that the positively charged sites are attractive to the negatively charged metal or alloy powders, thus producing a strongly associated metal-refractory composite powder. It is a feature of composite powders according to the invention that the individual particles or crystallites of metal and of refractory material have a very fine particle size. The preferred particle size range of the metal component of the composite powders is from about 0.2–2.0 microns; for the refractory materials we prefer to use colloidal materials such as sol-gel alumina which have particle sizes in the region of 50–100 Å.

In the case of a gold-refractory composite powder according to the first aspect of the invention for use in decorating compositions, the preferred relative amounts of metal and refractory material are determined by the need to achieve the required thermal stability coupled with a satisfactory decorative effect in a fired film of the decorating composition. Increasing the relative amount of refractory material increases the thermal stability and also, up to a certain level, the decorative effect, due to the physical bulk of the refractory material inhibiting or preventing globule formation; above the said level, however, the bulk volume of the refractory material is greater than or at least equal to that of the gold and the reflection properties of the fired film suffer in consequence. We have found in practice that the preferred percentage by weight of refractory material in powders according to the invention is within the range 10–25%, a more preferred range being 15–20%.

We already know that, in the manufacture of a metal powder for use at ordinary temperatures, by which is meant temperatures significantly below the melting point of the metal or alloy concerned, control over the particle size distribution can be exercised by a precipitation technique involving the stages of nucleation and controlled growth. We have now found, surprisingly, that the application of this technique to heat resistant substrates yields metal powders having remarkable high-temperature properties.

According to a further aspect of the invention, therefore, a method of producing a metal-refractory compsite powder comprising an intimate mixture, other than a mere physical admixture, of particles of platinum, palladium, rhodium, ruthenium, iridium, osmium, gold or silver, or an alloy containing one or more of said metals, and particles of a refractory material, comprises the steps of nucleating and, thereafter, growing particles of said metal or alloy in association with particles of said refractory material.

Broadly speaking, therefore, the method of the present invention includes the steps of nucleating the metal, for example gold, or alloy onto the surface of the refractory particles and then growing further metal or alloy in bulk onto the resulting nuclei. The resultant composition forms an intimate mixture, other than a mere physical admixture, of refractory and metal or alloy particles. It is generally necessary, in order to produce and to reproduce consistently a metal powder in which the particles are of the desired size, to control closely the steps of nucleation and growth.

The method will now be described in greater detail by way of example.

A first stage of the process is to activate the substrate. By "activate" we mean to ensure that the maximum surface are of the substrate becomes available for nucleation and subsequent growth. Methods of activation vary according to the nature of the substrate. For example, activation of a clay or a naturally-occurring mineral can be achieved by boiling it in water. Optionally, the water may also contain a solution of a strong reducing agent, such as hydrazine hydrate or sodium sulphite. An alternative activation procedure for a clay or a naturally-occurring mineral is to boil it in dilute mineral acid. On the other hand, an activation procedure for a synthetic refractory compound, if the inherent activity is too low, is to deposit active sites on the surface of the refractory. This may be carried out by using any or all of the methods of preparing ceramic and other heat resistant substrates for catalytic purposes, which methods are well known to those skilled in the art.

A second stage of the process is to nucleate particles of metal or alloy onto the surface of the activated substrate particles and this may be achieved by adding a suspension of the substrate particles in the activating agent to an aqueous solution of a salt of the metal or metals or applying an organo compound of the metal or metals and subsequently decomposing the same.

By way of example and with particular reference to gold powders, nucleation may be achieved by dispersing the refractory substrate particles in a solution of an organic sulphur-containing gold compound in an organic solvent, evaporating the solvent and thermally decomposing the gold compound.

Nucleation is then initiated by reducing the metal, e.g. gold salt, with a strong reducing agent which may be that already optionally present in the activation solution. If no reducing agent is present in the activation solution, nucleation may be induced by adding a strong reducing agent to the suspension of substrate in the mixture of activating agent and metal salt solution. The chemical nature of the strong reducing agent added to initiate nucleation may be similar to that of the reducing agent added to the activation solution, that is to say, hydrazine hydrate or sodium sulphite, for example. Vigorous stirring is desirable at this stage to ensure adequate and uniform dispersion of the substrate particles in the metal salt solution.

We prefer to add to the solution of metal salt, prior to the addition of the suspension of substrate particles in the activation solution, a colloidal protective agent. This agent controls nucleation and prevents agglomeration of the nucleated substrate particles. Examples of suitable colloidal protective agents are gum acacia, gum arabic, gelatin, egg albumin and dextrin, but in general the requirements of the colloidal protective agents are that they should have a high molecular weight and be capable of being adsorbed onto the surface of the nucleated substrate particles so that their agglomeration is physically prevented.

A third stage of the process is to grow further metal in bulk on the nuclei already present on the substrate surface. This is achieved by adding to the second-stage suspension a weak reducing agent, such as hydrogen peroxide or hydroquinone, for example. We prefer to add the reducing agent in portions and any foam generated may readily be suppressed by a spray of, for example, isopropanol. After all the weak reducing agents has been added, the suspension is stirred for some hours to complete the growth stage of the process. The resulting metal powder is then filtered off, washed and dried.

It is, of course, possible to provide a metal powder by combining the stages of nucleation and growth into a one-step process, using either a strong reducing agent alone or a weak reducing agent alone instead of the former followed by the latter. We have found, however, that the use of a strong reducing agent alone results in rapid nucleation and a fast growth rate; the two stages overlap and control of the process is poor. The use of a weak reducing agent alone improves the process control somewhat, but in these circumstances, the nucleation stage is somewhat slow and more difficult to control than compared with the case where a strong reducing agent is used. As the time factor is increased by slowing the rate of reduction, side effects occur, such as nucleation and growth on dust particles, the walls of vessels and stirrers and the like.

The major factor controlling the performance and stability during firing of films or coatings incorporating metal-refractory composite powders according to the invention is the maximum particle size of the metal component of the composite. We have found that the metal maximum particle size is governed by the preparative reaction conditions of temperature, initial metal concentration and the degree of induced nucleation. These are discussed below in turn.

(i) Temperature. We have found that increasing the temperature leads to an increase in the maximum metal particle size which in turn causes a decrease in stability. The optimum temperature is around 25° C.; temperatures approaching 60° C. result in poor stability.

(ii) Initial metal concentration. It has become apparent that this is the least important of the three variable conditions, but nevertheless an increase in the initial metal concentration (towards 100 g/l for gold) leads to an increased particle size with attendant loss of stability. An initial concentration of approximately 20 g/l is preferred.

(iii) Degree of induced nucleation. An increase in the degree of induced nucleation from a "low" figure of about 0.25 ml/g towards about 2.0 ml/g leads to a reduction in the maximum particle size and a consequential gain in stability.

The preferred maximum particle size for gold is approximately 1 micron; increasing the maximum particle size leads to a corresponding decrease in stability such that a particle size of 20 microns gives poor stability.

Figure 1:
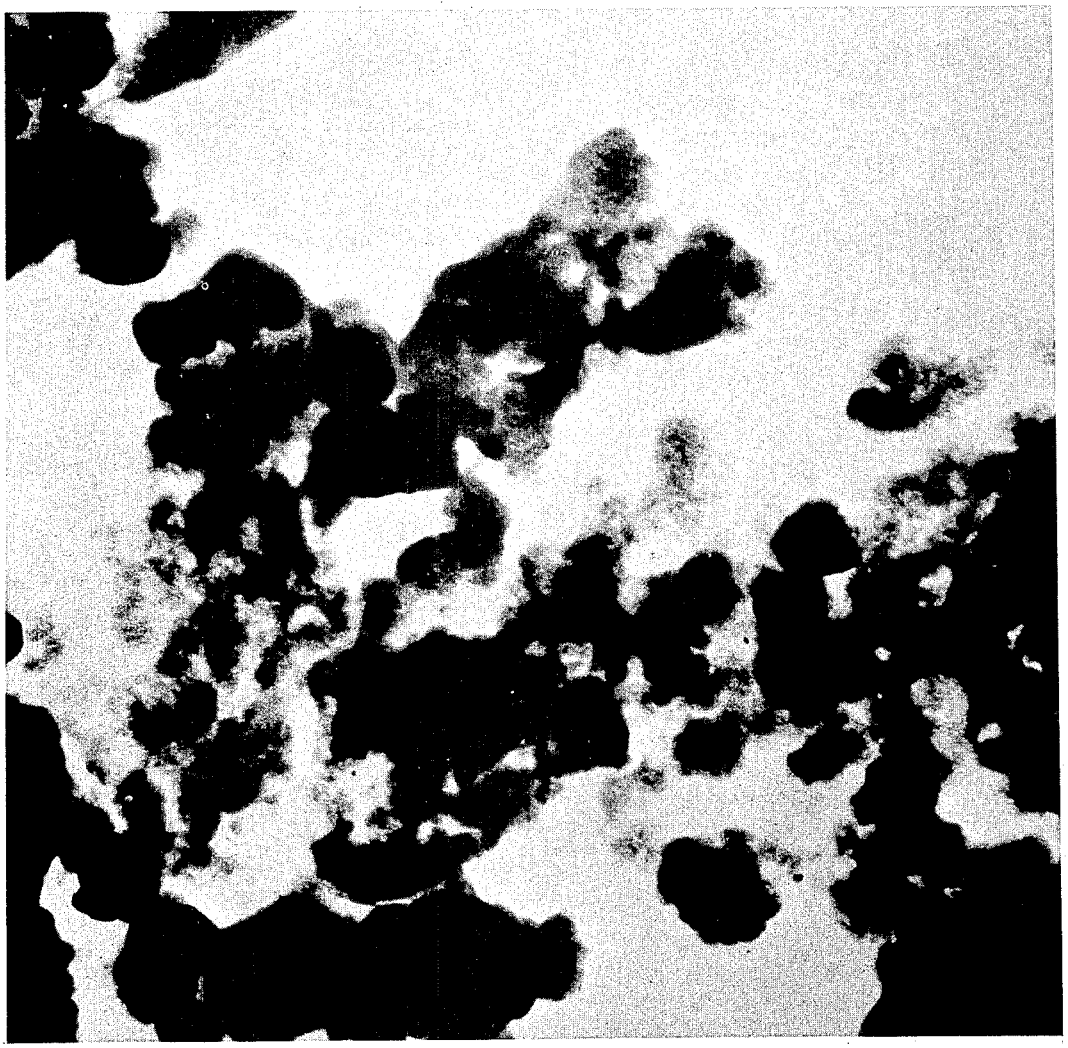
FIGS. 1 and 2 are micrographs illustrating aspects of the present powders.

The method will now be described by means of the following Examples, in which the preparation of a gold powder according to the invention is described.

EXAMPLE 1

75.0 g of gold as gold ammonium chloride was dissolved in 2.4 liters of distilled water in a 5 liter beaker. 40 ml of a 10% gum acacia solution was added and the mixture stirred to ensure complete dissolution of the gold salt. Meanwhile, 25 g of china clay was activated by boiling in 100 ml of distilled water containing 10 drops ($\equiv$0.45 ml) of a 6% hydrazine hydrate aqueous solution. The china clay/hydrazine hydrate suspension was then added with vigorous stirring to the gold solution. Upon addition, the colour of the mixture changed from yellow to yellow-green. After stirring for 10 minutes, 400 ml of "40 volume" hydrogen peroxide was added, as a result of which the colour changed from green to brown and foam was formed from reaction gases generated. The foam was suppressed using the minimum quantity of isopropanol from a laboratory spray. After 10 minutes, a further 100 ml of "40 volume" hydrogen peroxide was added, which caused further foaming, and the final 100 ml of hydrogen peroxide was added after a further 10 minutes. The reaction mixture was then stirred for 5 hours to complete the reaction, after which the clear supernatant liquor was decanted off and the powder was filtered off, washed and dried until constant weight was achieved.

EXAMPLE 2

80 g of gold as gold ammonium chloride was dissolved in 2 liters of distilled water in a 5 liter beaker. 40 ml of a 10% aqueous gum acacia solution was added and the mixture stirred to ensure complete dissolution of the gold salt. Meanwhile, 20 g of bentonite was activated by boiling in 200 ml of distilled water containing 0.45 ml of an aqueous 6% hydrazine hydrate solution. The bentonite/hydrazine hydrate mixture was then added with vigorous stirring to the gold solution. After stirring for 10 minutes, a 6% hydrazine hydrate aqueous solution was added to the mixture until the reaction was complete. The foam formed from the reaction gases generated was suppressed using the minimum quantity of isopropanol spray. When the reaction was complete the gold/bentonite composite was allowed to settle, the clear supernatant liquor was decanted off and the powder was filtered, washed and dried to constant weight.

EXAMPLE 3

80 g of gold as gold ammonium chloride was dissolved in 2 liters of distilled water in a 5 liter beaker. 40 ml of a 10% aqueous gum acacia solutin was added and the mixture stirred to ensure complete dissolution of the gold salt. Meanwhile, 20 g of zirconium dioxide powder was dispersed in 100 ml of water containing 0.45 ml of 6% hydrazine hydrate aqueous solution. The zirconia/hydrazine hydrate suspension was boiled and added with vigorous stirring to the gold solution. After stirring for 10 minutes, a solution of 200 g of sodium sulphite dissolved in 1 liter of water was added. The reaction was complete within 10 minutes. The resulting powder was allowed to settle and the supernatant liquid was decanted off. The powder was filtered, washed free from dissolved salts and was dried to constant weight.

EXAMPLE 4

90 g of platinum as sodium chloroplatinate was dissolved in 1500 ml water in a 5 liter beaker. 50 ml of a 10% aqueous gum acacia solution was added and the mixture was thoroughly stirred to allow the platinum salt to dissolve. Meanwhile, 10 g china clay was dispersed in 125 ml of a 1% hydrazine hydrate solution by boiling for 5 minutes. The clay dispersion was added to the platinum salt solution during vigorous stirring. After stirring for 10 minutes, sufficient aqueous 6% hydrazine solution was added to bring the reaction to completion. The resulting powder was allowed to settle, washed and dried to constant weight.

We have found that metal-refractory composite powders according to the invention exist as intimate mixtures, as shown by examination of a selection of gold-alumina powders by the techniques of x-ray photoelectron spectroscopy and electron microscopy.

In the photoelectron spectroscopy examination, the powders, each containing a different proportion of gold:alumina, were subjected to analysis of the gold:aluminium ratio at the surface. The specimens were prepared and were mounted on the plane faces of the specimen holders by coating a thin layer of conducting silver paste with the appropriate powder. The mounted specimens were introduced into the ultra high vacuum of the spectrometer and irradiated with monochromatic x-ray radiation. The photoelectrons emitted from the specimens were analysed for energy distribution and a spectrum of the distribution obtained.

A wide scan (1000 eV) covering the general pattern of emitted energies was followed on each specimen by a narrower scan, containing the 2 p and 2 s peaks of aluminium and the 4f doublet of gold. Measurement of peak heights of these lines enabled an approximate atomic ratio of gold to aluminium lying within an electron mean free path of the solid/vacuum interface of the specimens to be determined.

The surface ratios of gold to aluminium obtained by x-ray photoelectron spectroscopy were compared with the calculated theoretical gold:aluminium ratios for each powder.

| Gold:Aluminium ratios as calculated from experimental results | | | | | | |
|---|---|---|---|---|---|---|
| Powder type | A | B | C | D | E | F |
| Au:Al using Al 2 p line | 3.7 | 1.5 | 0.6 | 4.2 | 3.6 | 7.2 |
| Au:Al using Al 2 s line | 4.6 | 1.6 | 0.6 | 3.0 | 4.4 | 5.9 |

Note:
The variation in peak height ratios between 2p and 2s emissions from aluminium are in line with statements by Jorgenson & Berthou that quantitative measurements may only be accurate to within ± 20%.

| Comparison of Experimental and Theoretical Data | | | |
|---|---|---|---|
| Powder | Au:Al$_2$O$_3$ weight ratio | Au:Al Experimental Atomic Ratio (% Au) | Au:Al Theroetical % Au |
| C | 70:30 | 37.5 | 41.5 |
| B | 80:20 | 61 | 55 |
| A | 90:10 | 80 | 73.4 |
| D | 95:5 | 80 | 85.5 |
| E | 90:10 | 79 | 73.4 |
| F | 85:15 | 68 | 63.2 |

Note:
The theroetical Au:Al ratio was calculated by assuming the gold alumina relationship to be that of an homogeneous particulate mixture.

Taking into account the ±20% accuracy obtainable by this technique, comparison of the experimental and theoretical data shows only slight variations. This supports the assumption that the composite exists as an intimate mixture of gold and alumina particles. Furthermore an absence of "peak masking" implies that the encapsulation of one species by the other is not occurring.

The powders subjected to x-ray photoelectron spectroscopic analysis were also examined using transmission electron microscopy. Following ultrasonic dispersion in acetone, samples were mounted on copper grids and observed at magnifications between ×20,000 and 100,000.

A sample of a gold alumina composite that gave good results on porcelain was also examined by scanning electron microscope up to magnifications of 12,500.

A typical transmission micrograph can be seen in FIG. 1. The crystallite size of the alumina was below the maximum resolution of the instrument and appears in the micrograph as the grey diffuse areas, whilst the gold particles are evident as the sharper black areas. Observations confirm that the composites consist mainly of an intimate mixture of spherical gold particles and highly flocculated alumina.

Figure 2:
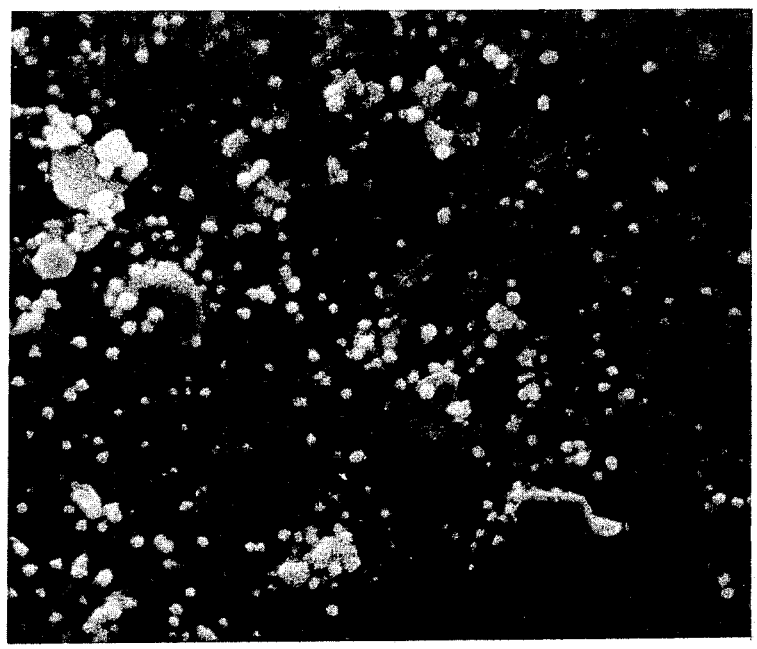

A typical scanning electron micrograph can be seen in FIG. 2. The gold appears as two distinct species; spherical particles with a size range of 0.25-0.5 μm, and crystalline hexagonal platelets of approximately 2-3 μm. The alumina particles are not as easily distinguishable as in the transmission micrographs.

We have found that gold-refractory composite powders according to the invention are excellent for use as pigments in a "burnish gold" preparation for decorating pottery and porcelain and for firing at high temperatures. Firing schedules for decorations and in common use at present employ a peak temperature of about 800° C., but modern furnaces are designed to operate at temperatures up to about 1050° C. (for chinaware) and up to about 1400° C. (for porcelain). At these temperatures, using burnish gold preparations containing standard gold powders, breakdown of the film occurs due to the gold sintering and forming into agglomerates. However, using a gold-refractory composite powder according to the invention, the resulting film has surprisingly high cohesive properties at temperatures as high as 1400° C. and the spatial configuration of the gold powder particles in the film is maintained. The resulting films are capable of being burnished to a continuous decorative film with good adhesion and no wrinkling, and exhibit outstanding physical and chemical durability.

Although the invention has been exemplified with reference to the preparation of a gold-refractory composite powder for use in a burnish gold preparation for pottery and porcelain dcoration, it is to be emphasized that the method of production may equally be applied to making metal powders of the platinum group metals and silver or alloys containing one of these metals, and uses are by no means limited to the decoration of pottery and porcelain. Metal-refractory composite powders according to the invention maintain their spatial configuration at high temperatures, in whatever application to which they are submitted. Powders according to the invention have the properties of the metals at ordinary temperatures, in that they can be formed into shapes, for example, and in addition the substrate particles provide a rigidity and dimensional stability at high temperatures that would cause an ordinary metal powder to break down.

One advantage of a metal-refractory composite powder according to the invention is that economy of the metal is achieved, as the refractory material can be considered as an "extender" which does not "dilute" or weaken in any way the physical properties of the metal, which is the case with the usual extenders which are used in the form of an intimate mixture or dispersion in the untreated metal powder.

Examples of some disadvantages of the platinum group metals and silver at high temperatures, which could be overcome by using the metal in the form of a metal-refractory composite powder according to the invention, are as follows Alloys of platinum and rhodium, near their softening point, lose their cohesive strength with the result that faults such as sagging develop. Therefore, according to the invention, thinner than normal sections of metal may be prepared by powder metallurgy.

Adjacent spirals of resistance thermometer elements tend to fuse together, causing short circuits.

During the metallising of heat resistant substrates by firing pads of conductor material, for example silver or silver-palladium, onto the substrate, adhesion of the metallising layer to the substrate may be good but the cohesive strength of the metallising layer is often low.

Expansion coefficients of substrates and metallising layers of conductors are often significantly different, leading to early metallising breakdown at only moderate temperatures.

Ordinary metal powders and formulations containing them have poor resistance to leaching by molten solders.

If desired, the heat resistant substrate particles may have applied thereto two or more coatings of different metals or alloys.

In addition to using metal powders in accordance with this invention for decorative purposes as already mentioned, the particles may be used as pelleted catalysts in, for example, oxidation and reduction reactions. Particular applications of such catalysts are:

(1) the purification of waste or tail gases from industrial plants; and
(2) the purification of automobile exhaust gases.

What is claimed is:

1. A metal refractory composite powder suitable for use at high temperatures comprises an intimate mixture, other than a mere physical admixture, of particles of platinum, palladium, rhodium, ruthenium, iridium, osmium, gold or silver, or an alloy containing one or more of said metals, and particles of a refractory material, the particles of refractory material being positively charged over at least a portion of the surface thereof, the refractory material being naturally-occurring and being selected from the group consisting of clays, silica, alumina, titania, zirconia, bentonite, boehmite and sol-gel or mixtures thereof; the particle size of the metal component of the powder having a size falling within the range 0.2 to 2.0 microns and the percentage by weight of the refractory material in the powder being within the range 10 to 25%.

2. A metal powder according to claim 1 wherein the refractory material is sol-gel alumina having a particle size falling within the range of 50 to 100 Å.

3. A metal refractory composite powder suitable for use at high temperatures comprises an intimate mixture, other than a mere physical admixture, of particles of platinum, palladium, rhodium, ruthenium, iridium, osmium, gold or silver, or an alloy containing one or more of said metals, and particles of a refractory material, the refractory material being a synthetic refractory material selected from the group consisting of silicon nitride, silicon carbide or mixtures thereof, the particle size of the metal component of the powder having a size falling within the range 0.2 to 2.0 microns and the percentage by weight of the refractory material in the powder being within the range 10 to 25%.

4. A metal refractory composite powder suitable for use at high temperatures comprises an intimate mixture, other than a mere physical admixture, of particles of platinum, palladium, rhodium, ruthenium, iridium, osmium, gold or silver, or an alloy containing one or more of said metals, and particles of a refractory material, the particles of refractory material being positively charged over at least a portion of the surface thereof, the refractory material being naturally-occurring and being selected from the group consisting of clays, silica, alumina, titania, zirconia, bentonite, boehmite and sol-gel alumina or mixtures thereof; the particle size of the metal component of the powder having a size falling within the range 0.2 to 2.0 microns; the particle size of the refractory material having a size falling within the range 50 to 100 Å and the percentage by weight of the refractory material in the powder being within the range 10 to 25%.

5. The metal refractory composite powder of claim 4 wherein the refractory material is china clay or sol-gel alumina.

* * * * *